United States Patent [19]
Wong

[11] 3,871,471
[45] Mar. 18, 1975

[54] AUXILIARY SYSTEM FOR DECELERATING VEHICLE

[76] Inventor: Walter C. Wong, 1104 Pensacola St., Honolulu, Hawaii 96814

[22] Filed: Mar. 9, 1973

[21] Appl. No.: 339,575

[52] U.S. Cl. ............... 180/82 R, 152/415, 188/1 R, 188/80, 251/77, 251/322
[51] Int. Cl. ............................................... B60t 1/04
[58] Field of Search ........... 180/82 R, 103; 152/415; 188/80, 1 R; 251/77, 322

[56] References Cited
UNITED STATES PATENTS

| | | | |
|---|---|---|---|
| 2,009,575 | 7/1935 | Card | 251/322 |
| 2,579,977 | 12/1951 | Sjolin | 251/322 |
| 2,716,015 | 8/1955 | Allen | 251/77 |
| 2,737,223 | 3/1956 | Plath | 152/415 |
| 2,841,199 | 7/1958 | Voelkel et al. | 152/415 |
| 3,361,180 | 1/1968 | Neilson et al. | 152/415 |
| 3,661,115 | 5/1972 | Rosenstein | 180/114 |
| 3,688,257 | 8/1972 | Mann | 180/114 |

*Primary Examiner*—Kenneth H. Betts
*Assistant Examiner*—John P. Silverstrim
*Attorney, Agent, or Firm*—James A. Wong

[57] ABSTRACT

An auxiliary system for decelerating a motor vehicle in imminent danger of collision, said system being operable to supplement the braking effect of the vehicle's brake system. The said auxiliary system comprising one or more wheels equipped with inflatable tires and laterally inwardly extending valve means on the inner sidewall thereof, deflating means movably supported on said vehicle laterally inwardly of said valve means, shifting means normally maintaining said deflating means out of engagement with said valve means and being adapted to urge said deflating means into contact with said valve means to reduce pressure of said tires upon actuation of said shifting means by command means by the operator of the vehicle.

12 Claims, 7 Drawing Figures

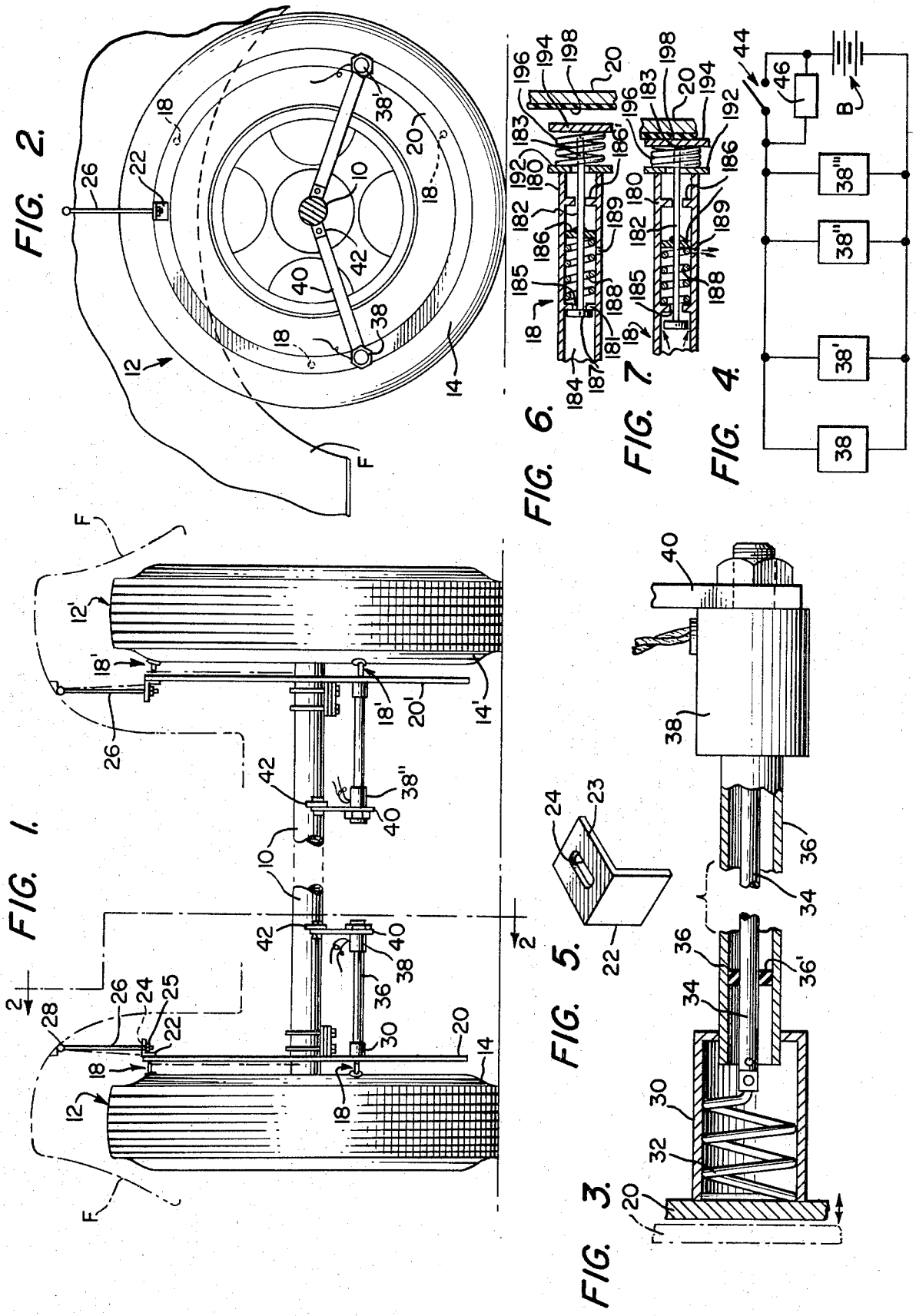

AUXILIARY SYSTEM FOR DECELERATING VEHICLE

BACKGROUND OF THE INVENTION

1. Field of the Invention

This invention relates to an auxiliary system for decelerating a motor vehicle having pneumatic tires, and in particular to vehicular safety systems such as might be used in emergency situations when conventional braking effort may be insufficient to arrest the motion of the vehicle.

2. Description of the Prior Art

As is well known all motor vehicles are equipped with braking systems for arresting motion thereof either for purposes of normal stops or of emergency stops, such systems being found in Class 188. Other vehicle safety systems may also be found in Class 152, particularly as they relate to tire pressure control systems, as exemplified by the Neilson et al. U.S. Pat. No. 3,361,180. The Neilson et al. patent, however, relates to aircraft wheel and tire assemblies. The basic purpose of Neilson et al is to enable an aircraft which has taken off fully loaded with its tires inflated at high pressure to land with partially deflated tires, particularly on an unprepared landing strip.

SUMMARY OF THE INVENTION

With the above background in mind, applicant has devised a vehicle deceleration system for use when the vehicle operator finds himself in imminent danger of a collision or when the vehicle braking system has failed.

According to the present invention an emergency tire deflation system is provided in a motorized road vehicle wherein on command of actuating means by the operator who finds himself in an apparent imminent collision situation, two or more tires may be partially deflated whereby surface friction is increased to supplement the motion arresting ability of the vehicles braking system.

Another object of the present invention is to provide tire pressure reducing means in a vehicle whereby pressure reduction is evenly distributed on each side of the vehicle.

Still another object of the present invention is to provide tire pressure reduction means in a vehicle whereby tire pressure reduction is limited to the extent that the affected tires are only partially deflated and retain some road engaging pressure so that the driver will have adequate control of his vehicle and bring it to a stop safely.

BRIEF DESCRIPTION OF THE DRAWINGS

For a better understanding of the present invention, reference may be made to the accompanying drawings in which:

FIG. 1 represents a rear elevational view of the rear wheels of a standard passenger car according to the present invention;

FIG. 2 is an elevational view taken along the plane 2—2 in FIG. 1;

FIG. 3 is an enlarged side elevational view, partly in section, of actuating means for the tire deflator according to the present invention;

FIG. 4 shows a schematic arrangement whereby a number of actuating means may be commanded by the operator to deflate the tires associated therewith;

FIG. 5 is an enlarged view in perspective of a support bracket for a tire deflator member according to the present invention;

FIG. 6 is an enlarged elevational view in section of a valve assembly with the associated deflator member according to the present invention maintained out of engagement therewith; and FIG. 7 is a view of the arrangement of FIG. 6 with the deflator member shifted into deflating position.

DESCRIPTION OF THE PREFERRED EMBODIMENT

The present invention will best be appreciated by considering first FIG. 1 in conjunction with FIG. 2 in which the rear axle 10 of a motor vehicle rotatably support a pair of wheels 12, 12' with pneumatic tires 14, 14' thereon. Extending laterally inwardly from the inner sidewall of each tire 14, 14' are a plurality of valve assemblies 18, 18'. Three such valve assemblies 18, for example, may be provided on each tire 14 approximately 120° apart, as best seen in FIG. 2. Mounted laterally inwardly from each of the tires 14, 14' are annular deflator plates 20, 20', respectively. The deflator plate 20, for example, is as best seen in FIG. 2 in generally concentric relationship with valve assemblies 18 and includes an L-shaped angled support bracket 22 welded thereto, for example, adjacent its upper edge. As best seen in FIG. 5 bracket 22 is formed with a laterally extending slot 24 in its generally horizontal flange, which permits deflator plate to be shifted laterally. As assembled on the vehicle deflator plates 20, 20' are supported at its upper edge by support rods 26 extending through slot 24 of bracket 22, for example, and having an abutment support nut 25 at the lower end of the rod 26 underneath the horizontal flange 23 of bracket 22. The size and shape of slot 24 allows lateral movement of deflator plate 20 in normal operation and also up or down movement of deflator plate 20 as road conditions vary. The support rods 26 are each secured at their upper ends to fenders F by a universal joint 28. As an adjunct to support nut 25 one or more washers (not shown) of suitable size may be disposed around support rod 26 and between nut 25 and flange 23.

In addition to being supported by rod 26, deflator plates 20, 20' are each connected to shifting means in the form of a pair of solenoids 38, 38' and 38'', 38''', respectively. This connection between plate 20 and solenoid 38, for example, as illustrated in FIG. 3, comprises a solid connection between plate 20 and the ends of tubular enclosure 30 and a coil spring 32 which is disposed within enclosure 30. The connection of plate 20 to enclosure 30 and spring 32, may conveniently be effected, for example, by welding. At the end opposite from its connection to plate 20 the coil spring 32 is connected to an extension 34 of the armature of solenoid 38. At one end of solenoid 38 a support strut 40 extends up to and is fixedly secured by lug 42 to axle 10. Armature extension 34 in the de-energized condition of solenoid 38 is biased to the right as seen in FIG. 3 by a conventional return spring (not shown) within the solenoid 38 so that the deflator plate 20 is normally held out of engagement with valve assemblies 18. Optional features of solenoid 38 and the extension 34 of its armature include a protective tube 36 disposed around extension 34 with an elastomeric spacing washer 36' in cushioning relationship therebetween. Washer 36' may be centrally situated along the length of tube 36 and will maintain solenoid extension 34 properly aligned in tube 36. Washer 36' will further prevent vibration or rattling of solenoid extension 34 inside tube 36. Tube 36 is integral with and extends from solenoid 38 and into an end flange of tubular enclosure 30 in telescoping relationship therewith.

Each valve assembly 18 in the normal closed and opened conditions as seen in FIGS. 6 and 7, respectively, comprises a sleeve extension 180, a valve stem 182 and an end 183 extending outwardly from sleeve extension 180. At its inner end stem 182 is provided with valve head 187 which upon being urged against its seat 181 closes off the passage 185. Radially disposed about stem 182 within sleeve extension 180 are a pair of spaced-apart flanges 186, 186'. Flange 186, for example, may be fixed to stem 182 to function both as a guide and as abutment means for valve closing spring 188, which also abuts against valve seat 181. Flange 186' may be fixedly secured to the inner wall of sleeve extension 180. Inwardly of valve sleeve extension 180 from valve seat 181 is chamber 184 which leads to the interior of the tire associated therewith. Outwardly from valve seat 181 valve sleeve extension 180 is provided with one or more side discharge ports 189. Integral with sleeve extension 180 and extending around valve stem 182 is a radial flange 192 to which is connected one end of expansion coil spring 196. Coil spring 196 is disposed around the free end 183 of valve stem 182 and normally extends a short distance therebeyond. Fixedly secured to the other end of spring 196 is a plate or disk 194, which is normally maintained out of engagement with end 183 of valve stem 182. Because of the presence of expansion spring 196, a sufficient clearance is maintained so that undesired contact of the end 183 of valve stem is not established even when there is slight lateral or sideways movement of the tires in going around a curve, for example. As mentioned above in the de-energized condition of solenoid 38, deflator plate 20 is maintained out of engagement with valve assembly 18, this being clearly seen in FIG. 6. An anti-friction or wear-resisting surface 198 of nylon or like material may be provided on deflator plate 20.

Shown in parallel arrangement in FIG. 4 are solenoids 38, 38', 38" and 38'" which may be energized by battery B when command means in the form of switch 44 in the operator's compartment is closed. Connected across switch 44 is a time-delayed circuit breaker 46 which may be of any known design and adapted to open the circuit after a lapse of a predetermined period.

With the structural details of the auxiliary decelerating system being fully described, its operation may now be considered. In normal operation of the vehicle and in normal stopping of the vehicle with its brake system the auxiliary system according to the present invention is not brought into operation. Only in an emergency situation, such as when the operator finds himself in imminent danger of a collision and he decides that the conventional brake system would be insufficient to arrest the motion of the vehicle in time to avoid a collision or when the vehicle's brakes have failed, is the auxiliary decelerating system of the present invention brought into operation.

Thus normally each deflator plate 20 of the auxiliary decelerating system according to the present invention is maintained out of engagement with the valve assemblies 18 of the tire 14 adjacent thereto. In the preferred embodiment, for example, deflator plate 20 may be maintained out of engagement with the valve assemblies 18 by spring means within the housing of the solenoid 38.

When the operator finds himself in a situation which in his judgment requires actuation of the auxiliary decelerator system according to the present invention, he would close the switch 44 which may be located on the vehicle dash board or steering column awaiting his use. Upon being closed the switch 44 causes the solenoids 38, 38', 38", and 38'", which as illustrated in FIG. 4 as being connected in parallel, to be energized by the battery B. When the solenoids 38, 38', 38" and 38'" are energized, they each will function in the manner as described below for solenoid 38.

As switch 44 is closed, extension 34 of the armature of solenoid 38 will be urged laterally toward wheel 12 by the electromagnetic field of the solenoid. As armature extension 34 moves toward wheel 12, it will through the intermediary of spring 32 urge deflator plate 20 laterally into engagement with valve assemblies 18 on the tire 14 adjacent thereto. When the deflator plate 20 is thus moved, tubular enclosure 30 will move along with it in sliding telescoping relationship with respect to tube 36. As best seen in FIG. 2 each deflator plate 20 will be acted on by at least two solenoids 38, 38' arcuately spaced-apart from each. The two arcuately spaced-apart solenoids 38, 38' will be sufficient to shift deflator plate 20 into engagement with valve assemblies 18, since lateral movement of the upper portion of deflator plate 20 is facilitated both by slot 24 in bracket 22 and the universal joint 28 at the upper end of support rod 26.

As deflator plate 20 and valve assemblies 18 are in concentric registration, engagement thereof may occur regardless of the location of the rotating valve assemblies 18 as related to hour positions of a clock.

Engagement of deflator plate 20 may be directly against a stem portion of the assembly, however, in the preferred embodiment deflator plate is provided with an anti-friction or wear-resisting surface 198 of nylon, for example, as seen in FIG. 6. Deflation is established as seen in FIG. 7 when surface 198 engages disk 194, which in turn depresses valve stem 182 thereby unseating valve head 187 which allows a burst of air to rush by passage 185 and out side discharge ports 189. Although disk 194 may be omitted, its use enhances the operable life of deflator plate 20, which would be very quickly worn out if subjected to direct contact with the ends 183 of valve stems 192 revolving at high speed about axle 10. As arranged discharge of air will occur simultaneously from each valve assembly 18 and further simultaneously from each tire 14, 14'. As each tire 14, 14' is deflated, the ground engaging radial surface thereof is gradually increased with an accompanying gradual increase in surface friction and decelerating effect, which thereby supplements the braking effect of the conventional braking system of the vehicle to preclude what might otherwise be an inevitable collision and wreck.

To prevent excessive deflation of tires 14, 14' time-delayed circuit breaker 46 will, after a lapse of a predetermined time after switch 44 is closed, open the circuit whereby the solenoids 38, 38', 38", 38'" are de-energized so that deflator plates will be retracted out of engagement with the various valve assemblies 18. At that time valve head 187 will become seated against seat 181 under the bias of spring 188 to prevent further deflation and maintain such tire pressure as is necessary to bring the vehicle to a stop safely.

Although the preferred embodiment of the present invention is disclosed in conjunction with a conventional passenger vehicle with two wheels per axle, and in particular on the rear axle, this invention may be installed on the rear wheels of a truck. Additionally, the deflator plates of the invention may be associated with and actuated by mechanical actuating linkage means, hydraulic actuating means or the like instead of the electrical circuitry disclosed herein. Also to ensure proper operation of the vehicle, the wheels which are the subject of the present invention should be dynamically balanced.

It is therefore to be clearly understood that although a single preferred embodiment of the present invention has been illustrated and described herein, numerous other variations or modifications therein may occur to those having skill in this art and what is intended to be covered herein is not only the illustrated forms of the invention, but also any and all modified forms thereof as may come within the spirit of said invention.

What is claimed is:

1. An auxiliary system for decelerating a motor vehicle in imminent danger of collision, said system being operable to supplement the braking effect of the vehicle's brakes, said system comprising one or more wheels having a pneumatic tire equipped with laterally inwardly extending valve means on the inner sidewall thereof, deflating means movably supported on said vehicle laterally inwardly of said valve means, shifting means normally restraining said deflating means out of engagement with said valve means and upon being actuated urging said deflating means into engagement with said valve means to reduce pressure of said tire upon actuation of said shifting means by command means by the operator of the vehicle, said valve means comprising two or more circumferentially spaced valves each having a laterally inwardly directed valve stem and a tubular housing around said stem and terminating short of the free end of said stem, said deflating means comprising an annular plate member supported for movement laterally of the vehicle into and out of engagement with said valves, and upper support means for said annular plate member including an L-shaped bracket fixedly secured to said plate member and formed with a laterally extending guide slot through which extends a rod in supporting relationship with said bracket.

2. The system as recited in claim 1 wherein said rod extends in a generally vertical direction and is connected at its upper end to the interior of a fender extending around the said wheel.

3. The system as recited in claim 2 wherein said rod is connected to said fender by a pivot joint whereby said rod is free to articulate at least laterally of said vehicle.

4. The system as recited in claim 3 wherein said plate member is further connected to secondary support means at positions both forwardly and rearwardly of said wheel and wherein said secondary support means includes said shifting means.

5. The system as recited in claim 4 wherein said shifting means are in the form of solenoids and said secondary support means at each of said forwardly and rearwardly positions includes a coil spring having one end fixedly secured to said plate member and a second end fixedly secured to an armature of said solenoids, the armature of each solenoid being biased toward the center of said vehicle when the solenoid is de-energized and outwardly to urge said plate member into engagement with said valve means when the solenoid is energized.

6. The system as recited in claim 5 wherein said armature is enclosed in a tubular housing and spaced therefrom by a cushioning washer or sleeve.

7. A vehicle in which both left and right wheels on a common axle are equipped with the system as defined in claim 6 and wherein the respective pairs of solenoids of said left and right wheels are connected in a parallel circuit and said command means which is a control switch located in the operator's compartment.

8. The combination as recited in claim 7 wherein said circuit includes a time-set circuitbreaker across said switch.

9. An auxiliary system for decelerating a motor vehicle in imminent danger of collision, said system being operable to supplement the braking effect of the vehicle's brakes, said system comprising one or more wheels having a pneumatic tire equipped with laterally inwardly extending valve means on the inner sidewall thereof, deflating means movably supported on said vehicle laterally inwardly of said valve means, shifting means normally restraining said deflating means out of engagement with said valve means and upon being actuated urging said deflating means into engagement with said valve means to reduce pressure of said tire upon actuation of said shifting means by command means by the operator of the vehicle, said valve means comprising two or more circumferentially spaced valves each having a laterally inwardly directed valve stem and a tubular housing around said stem and terminating short of the free end of said stem, said deflating means comprising an annular plate member supported for movement laterally of the vehicle into and out of engagement with said valves, and said tubular valve housing includes a radially extending flange on the free end thereof, spring means integral therewith disposed around the free end of said valve stem, extending beyond said valve stem, and having a disk integral with the free end thereof normally out of engagement with said valve stem, but which may be caused to engage said valve stem by said deflator plate.

10. The system as recited in claim 9 wherein said tubular housing includes one or more radially directed discharge ports and said valve stem extends out from said housing for a substantial distance.

11. The system as recited in claim 10 wherein said annular plate member includes a wear-resisting material on its operating surface of contact.

12. The system as recited in claim 11 wherein each of said wheels is dynamically balanced.

\* \* \* \* \*